Patented Mar. 16, 1943

2,313,900

UNITED STATES PATENT OFFICE 2,313,900

STEP-IN METHOD OF OPERATING OPEN HEARTH FURNACES

Charles A. Stemme, Large, Pa.

No Drawing. Application August 12, 1941,
Serial No. 406,482

2 Claims. (Cl. 75—61)

This invention relates to a step in the method of operating open hearth furnaces, and it is among the objects thereof to improve the effective heat application to the molten bath during certain stages of the melting and refining periods whereby the time between casts is substantially reduced.

In open hearth practice, lime stone is first charged on the hearth of the furnace, upon which ore and scrap is charged, and after the temperature of the charge is suitable for the addition of hot metal, the latter is poured into the furnace.

I have found that when open hearth furnaces are fired by certain fuels such as natural gas or coke oven gas, foaming of the bath will occur usually after the slag is tapped from the furnace. The foam is probably the result of the fluxing action of the lime stone, and produces a heavy froth on the surface of the molten bath which is an effective insulation against the heating flame, which is directed from either end of the furnace.

In accordance with the present invention, the surface froth on the molten bath may be quickly and effectively removed by the application of moisture, preferably in the form of a steam spray which may be injected through the charging doors of the furnace or by means of steam nozzles that may be placed outside of the combustion zone behind the burner ports.

While the force of the steam blast has some effect in displacing the froth, it is the moisture and perhaps the reduced temperature thus imparted to the foam and furnace that acts as a dispelling agent. The removal of the froth occurs almost instantly, thereby making the efficient application of the heat of the furnace effective on the molten bath to shorten the refining period of the metal.

Some of the advantages resulting from the use of my invention is the elimination of excess furnace temperatures for prolonged periods, which are destructive to the refractory of the walls and roof, and primarily the economy resulting from a substantial saving in the fuel input. The application of the steam to the bath does not appear to change the metallurgical properties of the steel and is not injurious to the furnace refractory.

Although one embodiment of the invention has been herein illustrated and described, it will be evident to those skilled in the art that various modifications may be made in the details of construction without departing from the principles herein set forth.

I claim:

1. The method of removing froth from the surface of the molten metal in open hearth furnaces immediately after the first slag has been tapped from the furnace during the melting down period of the basic open hearth steel making process, which consists of applying steam to the interior of the furnace.

2. The method of removing froth from the surface of the molten metal in open hearth furnaces immediately after the first slag has been tapped from the furnace during the melting down period of the basic open hearth steel making process, which consists of applying a steam blast directly to the froth on the surface of the molten bath.

CHARLES A. STEMME.